US012146573B2

(12) United States Patent
Kernbaum et al.

(10) Patent No.: US 12,146,573 B2
(45) Date of Patent: Nov. 19, 2024

(54) SHIFTING MECHANISMS FOR SPLIT-PULLEY VARIABLE TRANSMISSIONS

(71) Applicant: SRI INTERNATIONAL, Menlo Park, CA (US)

(72) Inventors: Alexander Kernbaum, Sunnyvale, CA (US); Murphy Kitchell, Menlo Park, CA (US); Thomas Egan, Marblehead, MA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 18/347,294

(22) Filed: Jul. 5, 2023

(65) Prior Publication Data

US 2023/0341030 A1 Oct. 26, 2023

Related U.S. Application Data

(62) Division of application No. 16/500,024, filed as application No. PCT/US2018/025804 on Apr. 3, 2018, now Pat. No. 11,732,787.

(Continued)

(51) Int. Cl.
*F16H 9/20* (2006.01)
*F16H 55/56* (2006.01)

(52) U.S. Cl.
CPC ............... *F16H 9/20* (2013.01); *F16H 55/56* (2013.01)

(58) Field of Classification Search
CPC .......... F16H 55/56; F16H 63/067; F16H 9/16; F16H 9/20

(Continued)

(56) References Cited

U.S. PATENT DOCUMENTS 1,031,988 A * 7/1912 Draullette ............. F16H 55/566
474/201
2,158,047 A * 5/1939 Weston ..................... F16H 9/24
474/30

(Continued)

FOREIGN PATENT DOCUMENTS

JP 2010-127382 A 6/2010

OTHER PUBLICATIONS

The International Search Report (ISR) with Written Opinion for PCT/US2018/025804 dated Jun. 28, 2018, pp. 1-10.

*Primary Examiner* — Henry Y Liu
(74) *Attorney, Agent, or Firm* — McDonnell Boehnen Hulbert & Berghoff LLP

(57) ABSTRACT

A variety of shifter mechanisms are provided for controlling the axial distance between half-pulleys of a split pulley variable transmission, thus controlling the transmission ratio of the variable transmission. Some of these embodiments include a differential such that a variable transmission can be driven and shifted differentially by two inputs. A torque or rotation difference between the inputs results in a change in the transmission ratio and in-common torque or rotation is transmitted through the transmission to an output. The same motors used to drive the output of the transmission are thus also able to effect shifts in the transmission ratio. Accordingly, motor mass that is not being used to effect high-speed shifts may be used to drive the transmission output, and vice versa. The provided shifter embodiments are well-suited to application to nested-pulley variable transmissions, including nested-pulley infinitely variable transmissions.

16 Claims, 7 Drawing Sheets

Related U.S. Application Data

(60) Provisional application No. 62/481,046, filed on Apr. 3, 2017.

(58) Field of Classification Search
USPC ............................................................ 474/19
See application file for complete search history.

(56) References Cited

U.S. PATENT DOCUMENTS

| | | | | |
|---|---|---|---|---|
| 2,431,494 | A * | 11/1947 | Morse | F16H 9/16 474/30 |
| 3,516,296 | A * | 6/1970 | Deteiler | F16H 63/067 474/23 |
| 3,726,158 | A * | 4/1973 | Brown | F16H 1/32 475/167 |
| 4,056,987 | A * | 11/1977 | Hoffmann | F16H 9/12 475/210 |
| 4,274,295 | A * | 6/1981 | Grube | F16H 55/56 474/43 |
| 4,453,701 | A * | 6/1984 | Huggett | B66D 1/7421 254/371 |
| 4,689,036 | A * | 8/1987 | Love | F16H 61/6625 474/19 |
| 4,869,705 | A * | 9/1989 | Fenton | F16H 63/067 474/8 |
| 4,909,776 | A * | 3/1990 | Sakakibara | F16H 63/062 474/11 |
| 5,013,283 | A * | 5/1991 | d'Herripon | F16H 9/125 474/8 |
| 5,050,457 | A * | 9/1991 | Takayama | F16H 63/062 474/70 |
| 6,383,102 | B1 * | 5/2002 | Onogi | F16H 61/66272 474/18 |
| 6,398,679 | B1 * | 6/2002 | Brown | F16H 55/56 474/30 |
| 6,398,680 | B1 * | 6/2002 | Onogi | F16H 61/66272 474/30 |
| 6,926,632 | B2 * | 8/2005 | Brown | F16H 9/16 474/8 |
| 7,048,658 | B2 * | 5/2006 | Butsch | F16H 25/2252 474/23 |
| 7,540,815 | B2 * | 6/2009 | Brown | F16H 9/18 474/43 |
| 8,894,520 | B2 * | 11/2014 | Labbe | F16H 55/56 474/19 |
| 10,851,887 | B2 * | 12/2020 | Hagihara | F16H 61/32 |
| 10,919,377 | B2 * | 2/2021 | Ranade | F16H 37/0806 |
| 2002/0019280 | A1 * | 2/2002 | Brown | F16H 9/16 474/8 |
| 2002/0183144 | A1 * | 12/2002 | Crewe | F16H 9/26 474/8 |
| 2003/0004022 | A1 * | 1/2003 | Brown | F16H 37/08 474/31 |
| 2004/0204283 | A1 * | 10/2004 | Inoue | F16H 61/6648 476/46 |
| 2007/0101820 | A1 * | 5/2007 | Bulatowicz | F16H 49/001 74/640 |
| 2007/0105671 | A1 * | 5/2007 | Binello | F16H 55/56 474/19 |
| 2008/0207363 | A1 * | 8/2008 | Maguire | B60K 17/16 474/272 |
| 2010/0272571 | A1 * | 10/2010 | Yonge | B62M 9/08 474/49 |
| 2014/0256495 | A1 * | 9/2014 | Waide | F16H 49/001 475/167 |
| 2015/0024882 | A1 * | 1/2015 | Ochab | F16H 63/067 474/19 |
| 2015/0075310 | A1 * | 3/2015 | Lunin | F16H 49/001 74/412 R |
| 2018/0372205 | A1 * | 12/2018 | Preuss | F16H 49/001 |
| 2019/0203816 | A1 * | 7/2019 | Fu | B62D 11/105 |
| 2019/0264791 | A1 * | 8/2019 | Atmur | F16H 49/001 |
| 2020/0032900 | A1 * | 1/2020 | Tokoi | F16H 61/66272 |
| 2020/0040981 | A1 * | 2/2020 | Zhao | F16C 23/082 |

* cited by examiner

SHIFTING MECHANISMS FOR SPLIT-PULLEY VARIABLE TRANSMISSIONS

CROSS-REFERENCE TO RELATED APPLICATION

This application claims priority to U.S. Provisional Patent Application No. 62/481,046, filed Apr. 3, 2017, PCT application US2018/025804, filed Apr. 3, 2018, and U.S. Non-Provisional patent application Ser. No. 16/500,024, filed Oct. 1, 2019 which are incorporated herein by reference.

BACKGROUND

Unless otherwise indicated herein, the materials described in this section are not prior art to the claims in this application and are not admitted to be prior art by inclusion in this section.

Transmissions are included as part of a variety of mechanisms in order to provide a mechanical advantage between an input torque and an output torque. Thus, a transmission may be included to match properties of a motor, engine, turbine, or other torque generator (e.g., a torque-speed curve, an efficiency curve) to properties of an effector, a wheel, a generator, or some other intended application for a generated torque. For example, a transmission may be provided in an automobile to match the high rotational speed and relatively lower torque generated by an internal combustion engine to lower speed and higher torque requirements for driving the wheels of automobile. In another example, a transmission may be provided to couple an internal combustion engine to a generator such that both the internal combustion engine and the generator are operated according to respective efficient rotational speeds, etc.

A transmission may have a set transmission ratio (the ratio of the rotation speed and/or applied torque at an input of the transmission to the rotation speed and/or delivered torque at an output of the transmission) or may have a controllable transmission ratio. The transmission ratio of such a transmission may be controllable via electronic, mechanical, hydraulic, and/or other methodologies (e.g., via actuation of a clutch, slidable gear(s), split pulley, drum, turbine vane(s), hydraulic valve(s), or other elements of the transmission by a motor, solenoid, or other methodologies). In some examples, a transmission may have a discrete number of selectable transmission ratios (or "gears") that can be selected by operating one or more clutches or other actuators. In other examples, a transmission may have a transmission ratio that is continuously controllable across a range of transmission ratios; such transmissions may be referred to as "continuously variable transmissions." Such variable transmissions may include split pulleys, toroidal drums, hydrostatic elements, or other actuatable components to permit continuous control of the transmission ratio across the range of transmission ratios.

A differential is a device that permits the distribution of an applied torque and/or rotation across multiple different outputs and/or the combination of multiple different applied torques and/or rotations to a single output. A differential may be configured in a variety of ways to provide a specified distribution of torques/rotations between the input(s) and output(s) of the differential. For example, a differential in an automobile may receive an input torque from the engine of the automobile and distribute that input torque to two wheels (e.g., two front wheels or two back wheels) of the automobile equally, such that equal force is provided against the ground by both wheels when the automobile is turning, even though opposite wheels may undergo unequal rotations during a turn.

SUMMARY

A variety of methods and mechanisms are available to facilitate the control and adjustment of the transmission ratio of a continuously variable transmission. This can include the use of one or more conical (or otherwise configured) split pulleys in the variable transmission. A split pulley is a pulley comprising two half-pulleys that are aligned along a common axis and whose axial separation is controllable. A belt (e.g., a V-belt) can engage conical (or otherwise configured) bearing surfaces on each of the half-pulleys such that the split pulley may drive, or be driven by, the belt. Additionally, forces may be transmitted, via the belt, to another split pulley to effect transmission of forces from one split pulley to the other. A transmission ratio of such a variable transmission is related to a ratio between the effective diameters of the split pulleys. By adjusting the axial separation of the split pulleys, their effective diameter may be changed (e.g., by changing the radial distance at which the belt engages the half-pulleys), thus controlling the transmission ratio of the variable transmission.

The axial separation of such split pulleys could be controlled by a variety of mechanisms. In some examples, these mechanisms could be adapted to be disposed within, and to rotate along with, the split pulley. In such examples, two or more input members could be provided to effect driving of the split pulley (e.g., to drive an output of the variable transmission) and to effect shifting of the transmission ratio of the variable transmission.

In some examples, such a mechanism could include a differential. Such a differential could permit two inputs to effect shifting through differential rotation/torque between the inputs and to effect driving of the transmission via in-common rotation/torque of the inputs. The use of such a differential could provide a number of benefits, including the ability to minimize the number of actuators necessary to both drive and effect shifting of the transmission, the ability to apply the torque and/or power rating of two drive motors to effect transmission ratio shifting (e.g., to effect shifting more quickly), the ability to use energy from the output of the transmission to assist in shifting the transmission ratio, the ability to apply actuator power to drive the output of the transmission when such power is not being applied to effect transmission ratio changes, among other benefits.

Some embodiments of the present disclosure provide a transmission having a controllable transmission ratio for more rapid or more controllable shifting. The transmission includes: (i) a first conical split pulley having a first half-pulley and a second half-pulley; (ii) a first input member; (iii) a second input member; and (iv) a differential. The differential is coupled to the first and second input members and the first and second half-pulleys such that a torque difference between the first input member and the second input member causes an axial force to be applied, via the differential, between the first half-pulley and the second half-pulley, thus allowing an axial distance between the first half-pulley and the second half-pulley to increase or decrease, which thereby enables a change in an effective diameter of the first conical split pulley resulting in the controllable transmission ratio of the transmission.

Some embodiments of the present disclosure provide transmission having a controllable transmission ratio for more rapid or more controllable shifting. The transmission includes: (i) a first conical split pulley having a first half-pulley and a second half-pulley; (ii) a first input member coupled to the first half-pulley and the second half-pulley such that a torque applied to the first input member is transmitted to the first and second half-pulleys; (iii) a second input member; and (iv) a screw. The second input member is coupled to the screw such that a differential rotation between the first input member and the second input member causes an axial force to be applied, via the screw, between the first half-pulley and the second half-pulley, thus allowing an axial distance between the first half-pulley and the second half-pulley to increase or decrease, which thereby enables a change in an effective diameter of the first conical split pulley resulting in the controllable transmission ratio of the transmission.

These as well as other aspects, advantages, and alternatives, will become apparent to those of ordinary skill in the art by reading the following detailed description, with reference where appropriate to the accompanying drawings.

DETAILED DESCRIPTION

Figure 1A:
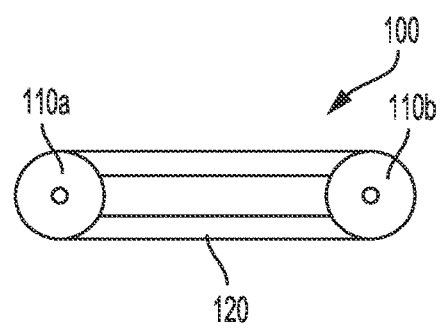
FIG. 1A is a side view of an example variable transmission.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Example Variable Transmissions

A mechanical transmission provides a coupling between an input and an output that is characterized by a transmission ratio. The transmission ratio characterizes the relationship between the rotational speed and torque at an input of the transmission to the rotational speed and torque at the output of the transmission. A transmission may thus be provided to modify the speed/torque of a rotation provided by a motor (or other torque-generating device), to control an overall impedance of an actuator or robot element, to increase the efficiency of an apparatus by permitting a motor to operate at a more efficient speed/torque, or to provide some other benefit. For example, a transmission is provided in an automobile to convert the high-speed, relatively low-torque output of an internal combustion engine to a lower-speed, higher-torque output to drive the wheels of the automobile. In another application, a transmission having a high transmission ratio may be provided in a robot arm to permit a very high speed, low-torque motor to provide a very high torque at a joint of the robot. Such a high speed, low-torque motor, combined with the transmission, may provide benefits including higher efficiency, lower overall mass, lower cost, or other benefits relative to the use of a high-torque motor without a transmission.

It can be desirable in a variety of applications to adjust the transmission ratio of a transmission during operation. For example, the transmission ratio could be controlled to adapt to changes in the torque and/or rotation speed to be provided at the output of the transmission (e.g., as the speed of an automobile increases), to maintain a driving motor within an efficient operational regime (e.g., high speed, low torque for an electrical motor), to adapt the effective impedance of the motor/transmission combination (e.g., to provide additional safety when a human interacts with a robot), or to provide some other benefit. In order for the transmission ratio of the transmission to be controllable, the transmission could include clutches, linear actuators, multiple different gear trains/planetary gear sets, or other elements that can be actively or passively operated electrically, mechanically, and/or hydraulically to effect changes in the transmission ratio. Such changes in transmission ratio could be between a number of different discrete transmission ratios. Alternatively, the transmission could be a continuously variable transmission configured to permit adjustment of the transmission ratio across a continuous range of transmission ratio values.

A continuously variable transmission can provide a number of benefits. For example, the transmission ratio may be controlled to an arbitrary value within a possible range of transmission ratios, rather than to a nearest value of a discrete set of transmission ratios provided by a non-continuously variable transmission. Accordingly, a continuously variable transmission permits the transmission ratio to be controlled to an optimal ratio such that a driving motor may be operated according to a high-efficiency speed/torque across a wide range of output speeds/torques. A continuously variable transmission may provide other benefits.

A transmission may be configured in a variety of ways to enable continuous control of transmission ratio across a range of transmission ratio values. In some embodiments, this may be achieved by controlling the effective diameter of one or more pulleys within the transmission. By controlling the effective diameter of a pulley, the ratio of rotation of that pulley relative to other elements (e.g., other pulleys) within the transmission, and thus the transmission ratio of the transmission, may be controlled.

In some examples, the pulley can be a split pulley having two half-pulleys. The half-pulleys have a common axis of rotation and each has an opposite conical (or otherwise-shaped) bearing surface that is in contact with a belt. The belt (e.g., a belt having a v-shaped cross-section) can thus drive, or be driven by, the split pulley. The effective diameter of the split pulley is related to the radius at which the belt contacts the half-pulleys. Thus, the effective diameter of the split pulley may be adjusted by changing the axial distance between the half-pulleys. By increasing the axial distance, the belt will contact the bearing surfaces of the half-pulleys closer to the axis of the split pulley, resulting in a reduced effective diameter. Conversely, the axial distance could be decreased such that the belt will contact the bearing surfaces of the half-pulleys farther from the axis of the split pulley, resulting in an increased effective diameter. The belt can be in contact with another pulley (e.g., another split pulley) to facilitate transmission of torque/rotation between an input (e.g., coupled to the first split pulley) and an output (e.g., coupled to the additional pulley). The transmission ratio of such a transmission can be related to the ratio between the effective diameters of the pulleys with respect to their interaction with the belt. Tension in the belt may be maintained by adjusting the effective diameter of both pulleys, by having a tensioner pulley, or by some other methodologies.

Figure 1B:
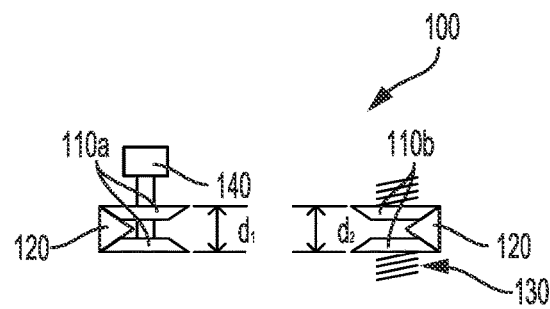
FIG. 1B is a top view of the variable transmission shown in FIG. 1A.

Relevant aspects of split pulleys are illustrated by way of example in FIGS. 1A-D. FIG. 1A shows a side view of a variable transmission 100 during a first period of time; FIG. 1B shows a top view of the transmission during the first period of time. The transmission 100 includes a first split pulley 110a having two half-pulleys, a second split pulley 110b having two half-pulleys, and a v-shaped belt 120 in contact with both split pulleys 110a, 110b. As shown in FIG. 1B, the axial distance between the two half-pulleys of the first split pulley 110a is $d_1$ and the axial distance between the two half-pulleys of the second split pulley 110b is $d_2$. A motor 140 is coupled to the first split pulley 110a to drive the transmission 100. As shown in FIG. 1A, the first 110a and second 110b split pulleys have the same effective diameter, and thus the transmission ratio of the transmission 110 during the first period of time is 1:1.

Figure 1C:
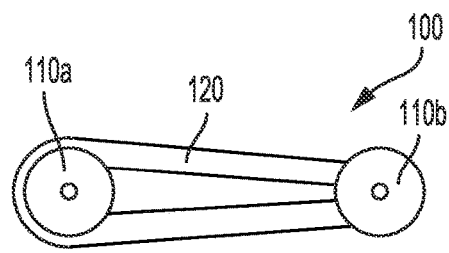
FIG. 1C is a top view of the variable transmission shown in FIG. 1A, after having undergone a shift in transmission ratio.
Figure 1D:
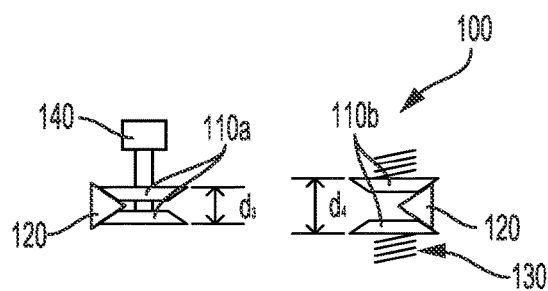
FIG. 1D is a top view of the variable transmission shown in FIG. 1C.

In this example, the effective diameter of the first split pulley 110a can be controlled by controlling an axial distance between the half-pulleys of the first split pulley 110a, and the effective diameter of the second split pulley 110b can be controlled by controlling an axial distance between the half-pulleys of the second split pulley 110b. The result of changing these effective diameters (relative to FIGS. 1A and 1B) is shown in FIG. 1C, which shows a side view of the variable transmission 100 during a second period of time, and FIG. 1D, which shows a top view of the variable transmission 100 during the second period of time. As shown in FIG. 1D, the axial distance between the half-pulleys of the first split pulley 110a has decreased from $d_1$ to $d_3$, resulting in an increase in the effective diameter of the first split pulley 110a, and the axial distance between the half-pulleys of the second split pulley 110b has increased from $d_2$ to $d_4$, resulting in a decrease in the effective diameter of the second split pulley 110b. These changes in the effective diameters of the split pulleys 110a and 110b increase the transmission ratio of the transmission 100 (e.g., from a 1:1 transmission ratio in FIGS. 1A and 1B to a 3:1 transmission ratio in FIGS. 1C and 1D).

Control of the axial distance between the half-pulleys of a split pulley (e.g., 110a) may be effected in a variety of ways by a variety of mechanisms, examples of which are described below. Accordingly, the effective diameter of the first split pulley 110a and/or the effective diameter of the second split pulley 110b may be controlled, thus controlling the transmission ratio of the transmission 100. As the effective diameter of the first split pulley 110a is changed, tension in the belt 120 may be maintained using an idler pulley and/or by changing the effective diameter of the second split pulley 110b. This may be effected in a variety of ways (e.g., by employing an actuator to independently control the axial distance between the half-pulleys of the second split pulley 110b, by using a mechanism to couple the axial distances of the two split pulleys 110a, 110b together such that controlling one axial distance effects control of the other, by using a passive mechanism including springs or other elastic elements). As shown in FIG. 1B, half-pulleys of the second split pulley 110b are coupled together via an elastic element 130 (e.g., a spring, coupled between a thrust bearing on the half-pulley and a mechanical ground of the transmission 100) such that an axial force is exerted between the half-pulleys of the second split pulley 110b. As the effective diameter of the first split pulley 110a changes, resulting changes in the tension in the belt 120 may interact with the axial force exerted by the elastic element 130 to effect a corresponding but opposite change in the effective diameter of the second split pulley 110b.

The arrangement of split pulleys, shown in FIGS. 1A-D, to form a variable transmission is intended as a non-limiting example embodiment. Split pulleys, belts, motors, shifting mechanisms, or other elements of such a transmission and/or of elements coupled thereto may be configured in alternative ways. In some examples, one of the split pulleys could be nested within the other. That is, some overlap occurs between the pulleys. Such a configuration could provide a variety of benefits. For example, by nesting one split pulley within the other, the overall size of the transmission could be reduced. This can be of benefit in automotive and robotic applications, where the volume and weight of the transmission may be reduced compared to the non-nested split pulley designs employed in automotive applications or the fixed-ratio planetary, harmonic, or otherwise-configured transmission designs employed in robotic applications.

In such a nested arrangement, the outer pulley could be rotationally grounded (i.e., the half-pulleys of the outer pulley could be prevented from rotating) and the inner pulley could be driven, by one or more inputs, via a cam such that rotation of the input(s) caused the inner split pulley to orbit about a rotational axis of the input(s) (e.g., to engage in cycloidal motion and rotation). An output member could then be coupled to the inner split pulley (e.g., to one or both half-pulleys of the inner split pulley via a cage gear or other methodologies) to permit transmission of rotation and/or torque from the input member, via the inner split pulley, to the output member. Such a transmission could provide a variety of benefits, including reduced size, high transmission ratios, or other benefits. Such a transmission may also allow for smaller changes in the axial separation of the split pulley halves to effect greater changes in the transmission ratio of the transmission, relative to a non-nested split pulley CVT configuration. Accordingly, the nested-pulley configuration may allow for increased speed in shifting the transmission ratio. Such increased shifting speed may provide a number of benefits, including increasing the safety of a robot by allowing the impedance of the robot's joints (and thus the effective impedance of the robot's limbs) to be continuously adjusted to increase the safety of the robot to any nearby humans (e.g., by reducing the impedance of the robot limb when in contact with a human).

In some examples, such a transmission could be configured such that it is controllable to have a transmission ratio of zero (i.e., that rotation of the input results in no rotation of the output) and/or to have negative transmission ratios (i.e., the transmission ratio of the transmission is controllable such that the direction of rotation of the output, relative to the input, is invertible). Such a transmission, having a transmission ratio that is controllable across a range of transmission ratio values that includes zero, may be referred to as an "infinitely variable transmission." Such a transmission may allow for reversal of the direction of the transmission output without clutches, reducing the size and cost of the transmission relative to designs used, e.g., in automotive and robotics applications to provide reverse gearing, where multiple transmissions/gears and attendant clutches may be provided to allow for high torque and low speed operation in both directions.

Figure 2:
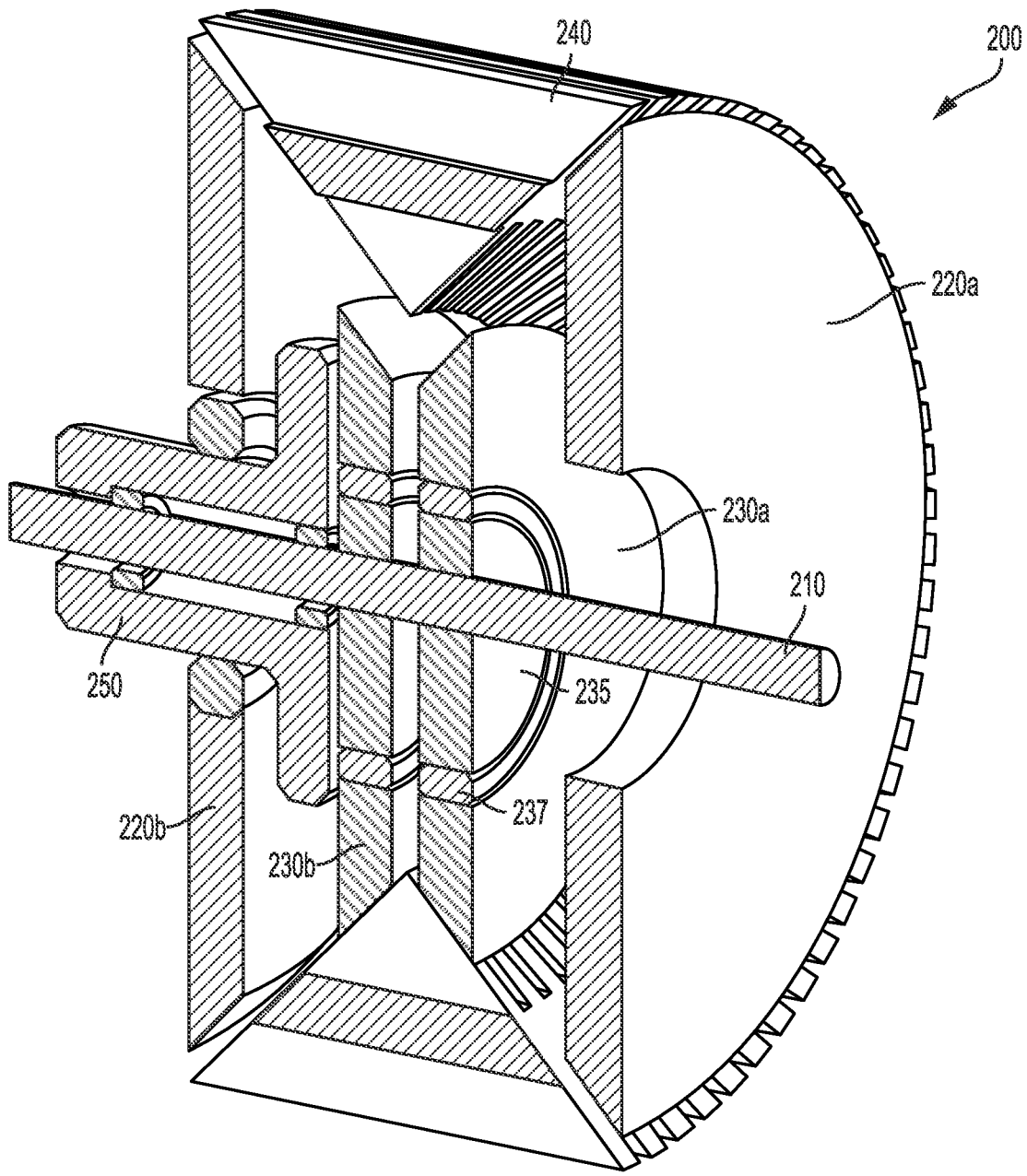
FIG. 2 is a perspective cross-sectional view of an example variable transmission.

An example of such a transmission is illustrated in FIG. 2. A variable transmission 200 includes a first split pulley having first 230a and second 230b half-pulleys. The transmission 200 additionally includes a second split pulley having third 220a and fourth 220b half-pulleys. The first and second split pulleys are coupled via a belt 240. The first split pulley is nested within the outer split pulley. This includes an axis of rotation of the first split pulley being located within an outer perimeter of the second split pulley. An input member 210 is coupled to the first split pulley via a cam 235 and a cam bearing 237. The input 210 and the first split pulley have respective different, offset axes of rotation. Rotation of the input 210 results in translation of the axis of rotation of the first split pulley about the axis of rotation of the input 210, rotation of the half-pulleys 230a, 230b, and a transmission of torque from the first split pulley to the second split pulley via the belt 240. Thus, rotation of the input 210 may result in cycloidal motion of a particular portion of the first split pulley (e.g., of a particular point on the first half-pulley 230a).

The transmission 200 additionally includes an output member 250. The transmission 200 may be configured to transmit a rotation and/or torque from the input member 210 to the output member 250 according to a controllable transmission ratio by mechanically grounding the half-pulleys of the second split pulley 220a, 220b to prevent them from rotating and by coupling the output member 250 to at least one of the half-pulleys of the first split pulley 230a, 230b such that rotation of the first split pulley results in rotation of the output member 250. This could include configuring the output member 250 as a cage gear configured to couple with corresponding elements (e.g., a plurality of formed holes) of a half-pulley 220a, 220b of the first split pulley.

Note that, while the transmissions described herein are characterized as including inputs from which power is transmitted to outputs, these transmissions may additionally or alternatively be configured to be back-drivable or otherwise configured to permit bidirectional energy transmission and/or energy transmission from output(s) to input(s). For example, transmissions as described herein could be used to bidirectionally transfer energy between joints of a robot, e.g., to increase the overall efficiency of the robot by permitting energy to be harvested from one joint (e.g., a joint currently receiving energy from, e.g., contact with the ground) and applied to another joint (e.g., a joint currently being employed to exert force on a payload), or vice versa. Additionally, such a configuration could permit multiple degrees of freedom (e.g., of one or more joints of a robot) to be driven by a single motor (e.g., via respective nested-pulley infinitely variable transmissions).

II. Example Differential Shifting Mechanisms

The transmission ratio of a split pulley variable transmission may be controlled by controlling the axial distance between the half-pulleys of one (or more) of the split pulleys of the transmission. Accordingly, a belt of the transmission will contact bearing surfaces (e.g., conical bearing surfaces of the half-pulleys of a conical split pulley) at different locations, resulting in a change in the effective diameter of the split pulley and a change in the transmission ratio of the transmission.

A variety of mechanisms may be applied to effect such control of the axial distance between the half-pulleys. In some examples, the split pulley may be driven by two (or more) inputs and a differential may be provided to apportion torque from the two inputs between applying power to drive an output of the transmission and applying power to effect shifting of the transmission ratio of the transmission. For example, such a differential could be configured such that a torque difference between the two inputs causes axial force to be applied, via the differential, between first and second half-pulleys of a split pulley. Accordingly, the axial distance between the first and second half-pulleys could increase or decrease, enabling a change in an effective diameter of the split pulley. By facilitating the control of such changes in the axial distance, the differential permits control of the transmission ratio of the transmission that includes the split pulley. The differential could additionally apply a net torque from the inputs to the split pulley such that the net torque is applied to an output of the transmission (e.g., via a belt, an additional split pulley, and/or other elements).

Such a differential mechanism may provide a variety of benefits. For example, it may permit two high-power drive motors to be applied to both driving the output of a transmission and to effecting changes in the transmission ratio of the transmission. Since the rate at which transmission ratio shifts may occur is related to the power applied to effect the shift, the use of two large, high-power motors may permit very fast shifting. Additionally, when those motors are not being operated "differentially" to shift the transmission ratio, the full power of the two motors may be used to drive the output. Thus, the differential configuration allows for rapid, controllable high-power shifting without requiring a large, high-power motor (and its attendant size, weight, and cost) to be allocated for shifting alone. Additionally, the differential shifter embodiments described herein may be configured to be back-drivable or otherwise configured to permit energy (e.g., torques) received from the output to assist in effecting transmission ratio shifts, further increasing the efficiency of the transmissions.

FIGS. 3-6 illustrate embodiments in which a differential shifter receives two inputs, which may either extend in opposite directions from the differential/split pulley or that may be coaxial and concentric, with one input disposed at least partially within the other (e.g., one input shaft disposed within a hollow center of the other). In other embodiments, the inputs need not be nested in such a manner. These transmission ratio shifting mechanisms may be applied to effect axial separation changes for the "inner" or "outer" split pulleys of a nested-pulley differential (e.g., the nested-pulley differential of FIG. 2), or the split pulleys of a variable transmission configured in some other manner (e.g., the variable transmission of FIGS. 1A-1D). These illustrated embodiments are intended as non-limiting examples; any embodiment which illustrates nested inputs may, with appropriate modification, receive inputs extending in opposite directions from the differential, or vice versa.

Further, a transmission as described herein, or an element thereof (e.g., a differential) may include additional or alternative elements to facilitate some application. For example, a transmission may include additional gearing to, e.g., provide a rotation on a different axis, to provide a gear reduction, or to provide some other mechanical effect. These modifications may be provided to, e.g., control a relationship between the differential torque and the applied transmission ratio-shifting force, to asymmetrically apportion energy from each of the two inputs toward transmission ratio-shifting and/or output driving, to control a mechanical advantage in shifting and/or output driving to one or both inputs, to convert a rotational motion into a linear motion (e.g., to exert an axial force between half-pulleys of a conical split pulley), or to provide some other benefit according to an application.

A. Spur Gear Differential Shifter

In some examples, a spur gear differential could be provided in order to effect a differential shifter as described herein. Pinion gears of the spur gear differential may then be coupled to screws or other mechanical elements so as to couple rotation of the spur gears (as a result of differential rotation of the inputs to the differential) into an axial force/movement between the half-pulleys of a split pulley. In some examples, the half-pulleys could be threaded into each other, and the rotation of the pinion gears could be coupled into a relative rotation between the two half-pulleys, effecting a change in the axial distance between the half-pulleys via the threads coupling the half-pulleys together.

Figure 3:
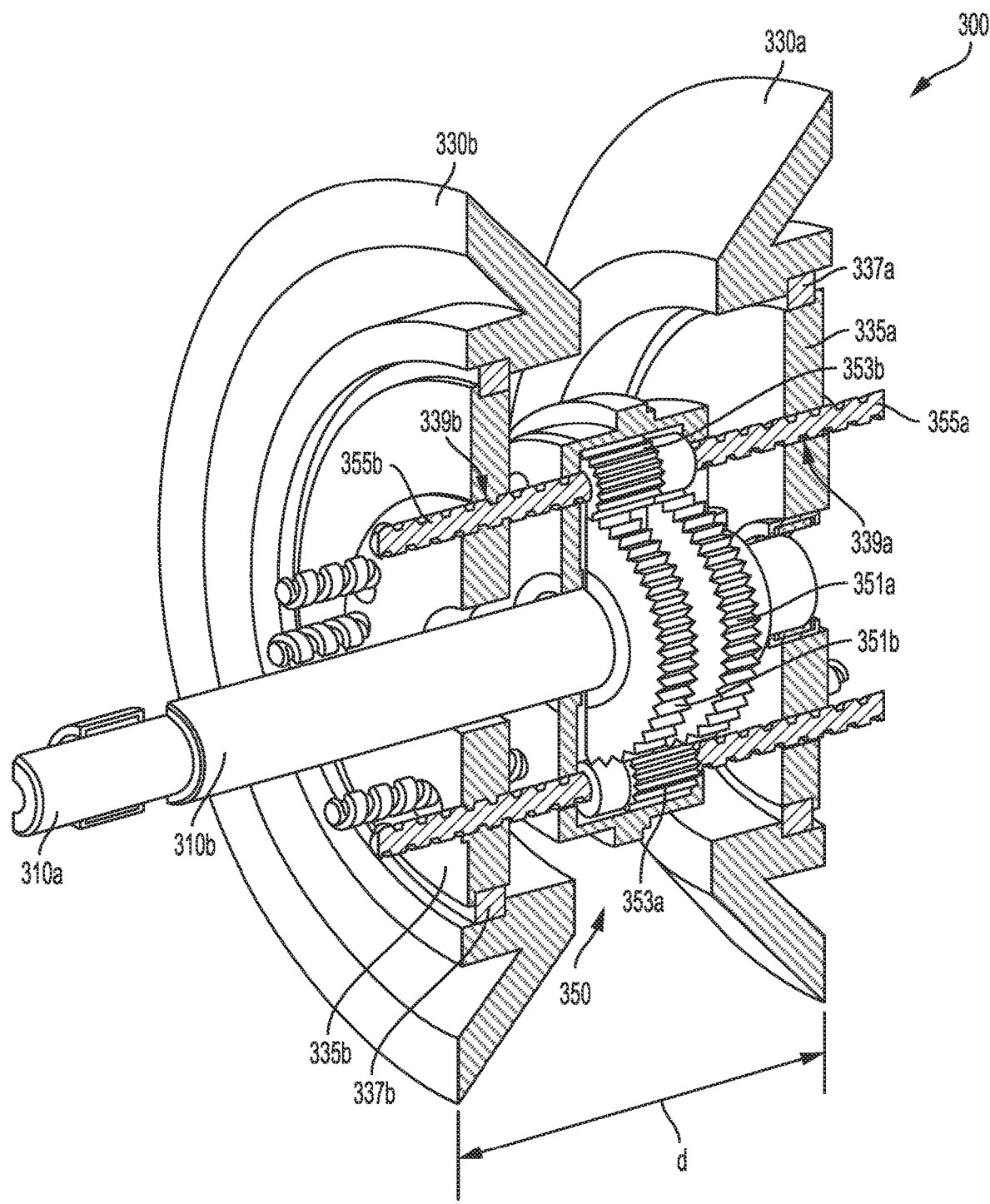
FIG. 3 is a perspective cross-sectional view of an example shifting mechanism of a variable transmission.

FIG. 3 illustrates an example split pulley 300 (e.g., a split pulley of a variable transmission) that includes a spur gear differential 350 coupled to two input members 310a, 310b and to two half pulleys 330a, 330b such that a torque difference between the first input member 310a and the second input member 310b causes an axial force to be applied, via the differential 350, between the first half-pulley 330a and the second half-pulley 330b, thus allowing an axial distance ("d") between the first half-pulley 330a and the second half-pulley 330b to increase or decrease. The first 310a and second 310b input members are coaxial and concentric, and the first input member 310a is disposed partially within the second input member 310b.

The differential 350 includes a first input gear 351a and a second input gear 351b. The first 351a and second 351b input gears are coupled to the first 310a and second 310b input members such that rotation of an input member results in rotation of a respective input gear. The differential 350 also includes a first set of pinion gears (including a first pinion gear 353a) that engage with the first input gear 351a and a second set of pinion gears (including a second pinion gear 353b) that engage with the second input gear 351b. Each pinion gear of the first set of pinion gears engages with a respective pinion gear of the second set of pinion gears (not shown) such that a difference in rotation between the first 310a and second 310b input members results in rotation of the pinion gears 353a, 353b relative to a housing of the differential 350.

Rotation of the pinion gears 353a, 353b may be coupled into an axial force/motion between the half-pulleys 330a, 330b in a variety of ways. As shown, each pinion gear (e.g., 353a) is coupled to two screws (e.g., screws 355a, 355b). The screws 355a, 355b, in turn, are coupled to the half-pulleys 330a, 330b via respective threaded holes 339a, 339b (and further, via respective cams 335a, 335b and cam bearings 337a, 337b) such that rotation of the pinion gears 353a, 353b results in rotation of the screws 355a, 355b, thereby enabling a change in the axial distance ("d") between the half-pulleys 330a, 330b.

A net torque provided by the first 310a and second 310b input members may be applied to the half-pulleys 330a, 330b, e.g., to drive a belt of a variable transmission and thus to drive an output of the variable transmission. Such a net torque may be coupled from the inputs to the half-pulleys via a housing of the differential 350, via the screws, or via some other element(s) of the split pulley 300.

Note that the embodiment shown in FIG. 3 is intended only as a non-limiting example. Alternative embodiments are anticipated. For example, the differential 350 could be rigidly axially coupled to one of the half-pulleys (e.g., 330b) and could extend screws, via respective threaded holes, into the opposite half-pulley (e.g., 330a). The example half-pulleys 330a, 330b are coupled to the inputs 310a, 310b via respective cams 335a, 335b and cam bearings 337a, 337b to facilitate cycloidal motion of the half-pulleys 330a, 330b in response to net rotation of the input members 310a, 310b. However, the half-pulleys 330a, 330b could be driven directly by the input members 310a, 310b (e.g., by omitting the bearings 337a, 337b and rigidly coupling the half-pulleys 330a, 330b to the cams) and/or the half-pulleys 330a, 330b could be driven by input members that rotate about an axis in common with the half-pulleys 330a, 330b.

B. Bevel Gear Differential Shifter

In some examples, a bevel or crown gear differential could be provided in order to effect a differential shifter as described herein. Bevel gears of the bevel gear differential may then be coupled to toothed pins, linear gears or racks, screws, or other mechanical elements so as to couple rotation of the bevel gears (as a result of differential rotation of the inputs to the differential) into an axial force/movement between the half-pulleys of a split pulley. In some examples, the half-pulleys could be threaded into each other, and the rotation of the bevel gears could be coupled (e.g., via additional bevel gears) into a relative rotation between the two half-pulleys, effecting a change in the axial distance between the half-pulleys via the threads coupling the half-pulleys together.

Figure 4:
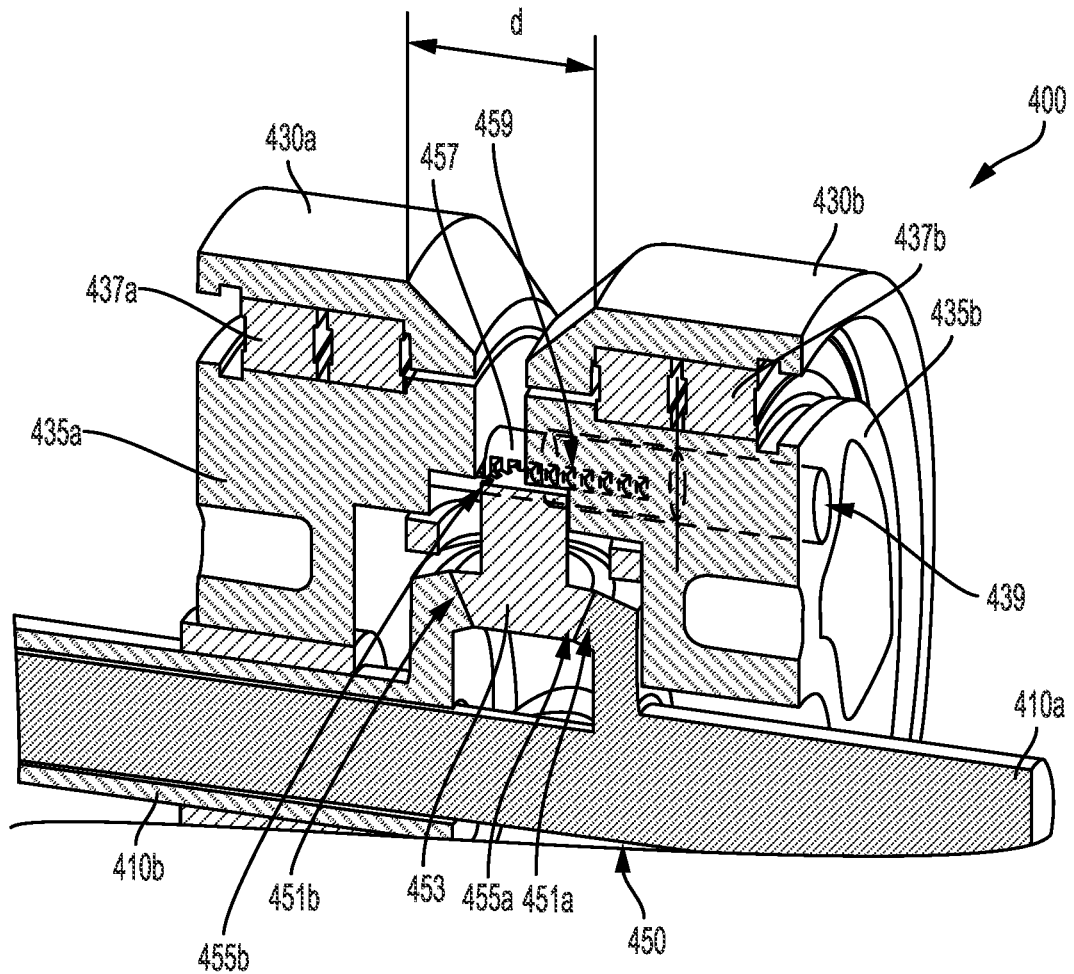
FIG. 4 is a perspective cross-sectional view of an example shifting mechanism of a variable transmission.

FIG. 4 illustrates an example split pulley 400 (e.g., a split pulley of a variable transmission) that includes a bevel gear differential 450 coupled to two input members 410a, 410b and to two half pulleys 430a, 430b such that a torque difference between the first input member 410a and the second input member 410b causes an axial force to be applied, via the differential 450, between the first half-pulley 430a and the second half-pulley 430b, thus allowing an axial distance ("d") between the first half-pulley 430a and the second half-pulley 430b to increase or decrease. The first 410a and second 410b input members are coaxial and concentric, and the first input member 410a is disposed partially within the second input member 410b.

The differential 450 includes a first input gear 451a and a second input gear 451b (e.g., crown gears). The first 451a and second 451b input gears are coupled to the first 410a and second 410b input members such that rotation of an input member results in rotation of a respective input gear. The differential 450 also includes a first bevel 453 that engages with the first input gear 451a and second input gear 451b via a set of teeth 455a such that a difference in rotation between the first 410a and second 410b input members results in rotation of the bevel gear 453 relative to a housing of the differential 450.

Rotation of the bevel gear 453 may be coupled into an axial force/motion between the half-pulleys 430a, 430b in a variety of ways. As shown, the bevel gear 453 is axially fused to a pinion 455b. The pinion 455b engages with teeth 459 of a rack 457. The rack 457 is disposed partially within a corresponding hole 439 formed in a cam 435b that couples forces/torques, via a cam bearing 437b, into the second half-pulley 430b from the inputs 410a, 410b and/or the differential 450. The rack 457 is coupled to the first half-pulley 430a (via a cam 435a and cam bearing 437a) such that rotation of the bevel gear 453 and pinion 455b exerts an axial force on the rack 457, thereby enabling a change in the axial distance ("d") between the half-pulleys 430a, 430b.

A net torque provided by the first 410a and second 410b input members may be applied to the half-pulleys 430a, 430b, e.g., to drive a belt of a variable transmission and thus to drive an output of the variable transmission. Such a net torque may be coupled from the inputs to the half-pulleys via a housing of the differential 450, via a force exerted by the pinion 455b onto the rack 457, or via some other element(s) of the split pulley 400.

Note that the embodiment shown in FIG. 4 is intended only as a non-limiting example. Alternative embodiments are anticipated. For example, the differential 450 could be rigidly axially coupled to neither of the half-pulleys and could engage with additional racks that are coupled to the second half-pulley 430b, enabling axial motion of the half-pulleys 430a, 430b that is symmetric with respect to the bevel gear(s) or other elements of the differential 450. The differential 450 could include additional bevel gears (e.g., one, two, or three additional bevel gears) and corresponding additional racks coupled to one or the other of the half-pulleys 430a, 430b. The example half-pulleys 430a, 430b are coupled to the inputs 410a, 410b via respective cams 435a, 435b and cam bearings 437a, 437b to facilitate cycloidal motion of the half-pulleys 430a, 430b in response to net rotation of the input members 410a, 410b. However, the half-pulleys 430a, 430b could be driven directly by the input members 410a, 410b (e.g., by omitting the bearings 437a, 437b and rigidly coupling the half-pulleys 430a, 430b to the cams) and/or the half-pulleys 430a, 430b could be driven by input members that rotate about an axis in common with the half-pulleys 430a, 430b.

C. Ring Gear Differential Shifter

In some examples, an epicyclic differential could be provided in order to effect a differential shifter as described herein. Planet gears of the epicyclic differential may then be coupled to screws, toothed pins, linear gears or racks, or other mechanical elements so as to couple rotation of the planet gears (as a result of differential rotation of the inputs to the differential) into an axial force/movement between the half-pulleys of a split pulley. In some examples, the half-pulleys could be threaded into each other, and the rotation of the planet gears could be coupled into a relative rotation between the two half-pulleys, effecting a change in the axial distance between the half-pulleys via the threads coupling the half-pulleys together.

Figure 5A:
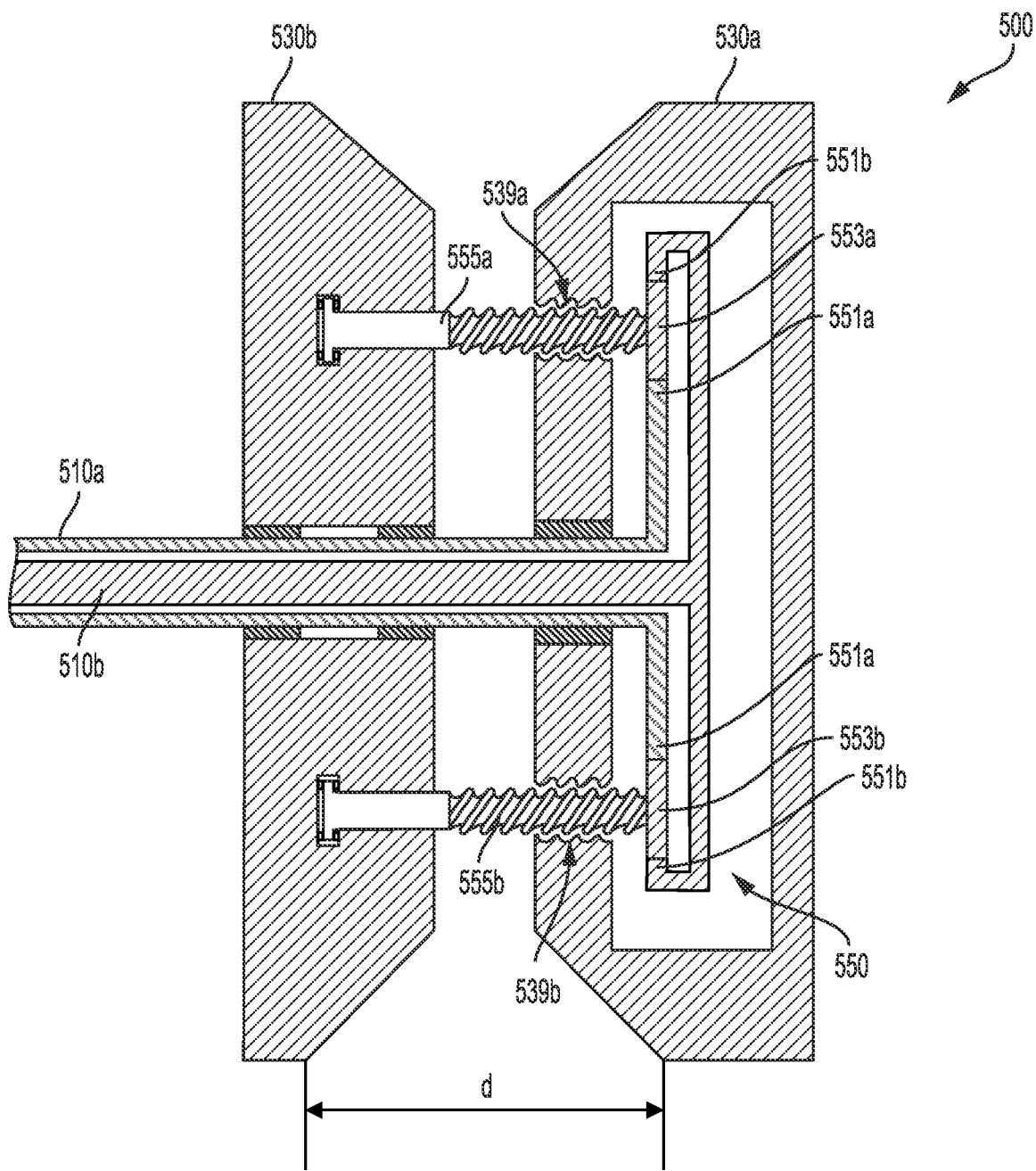
FIG. 5A is a cross-sectional view of an example shifting mechanism of a variable transmission.
Figure 5B:
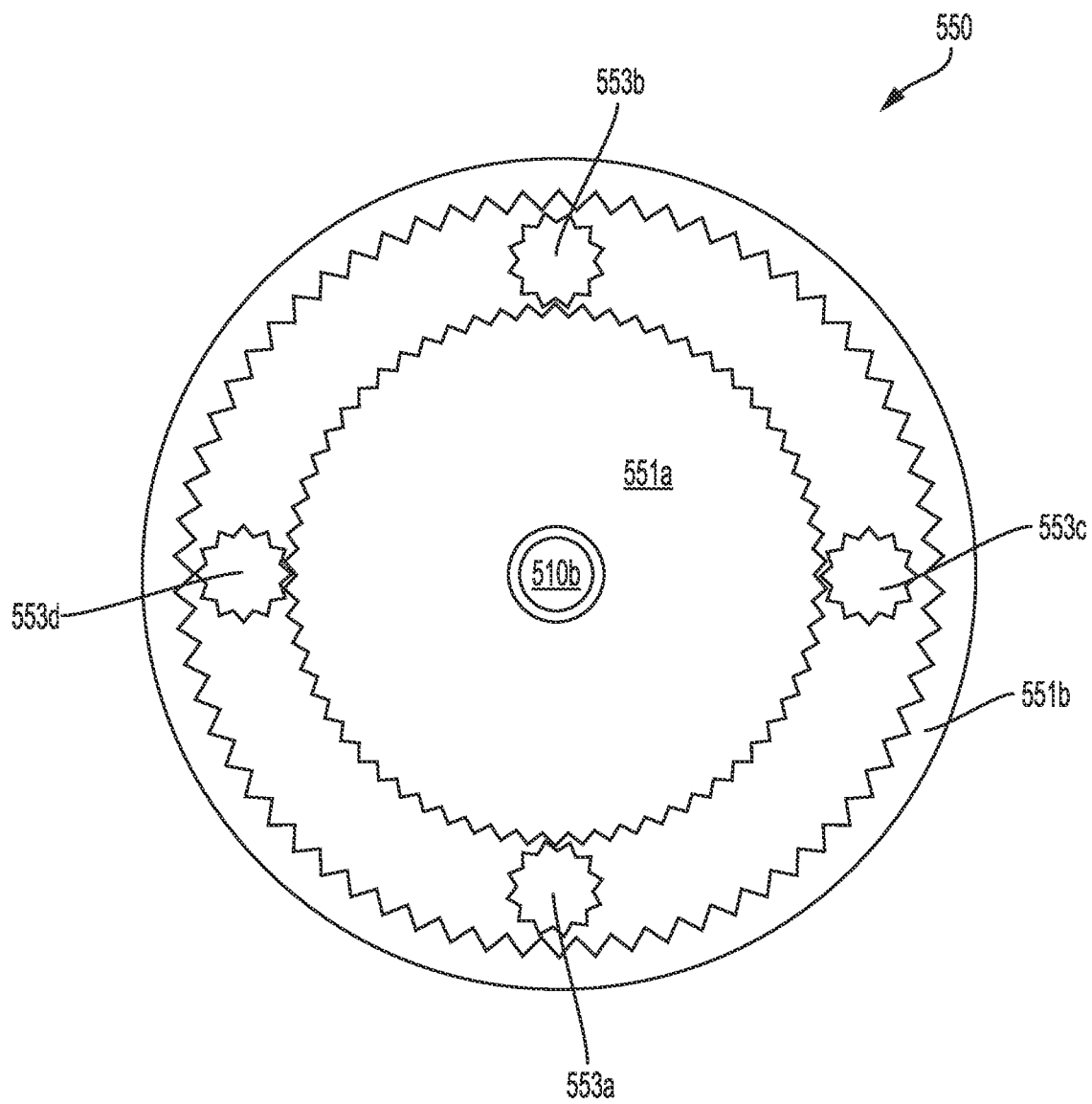
FIG. 5B is a schematic illustration of elements of the example shifting mechanism shown in FIG. 5A.

FIG. 5A illustrates, in cross-section, an example split pulley 500 (e.g., a split pulley of a variable transmission) that includes an epicyclic differential 550 coupled to two input members 510a, 510b and to two half pulleys 530a, 530b such that a torque difference between the first input member 510a and the second input member 510b causes an axial force to be applied, via the differential 550, between the first half-pulley 530a and the second half-pulley 530b, thus allowing an axial distance ("d") between the first half-pulley 530a and the second half-pulley 530b to increase or decrease. The first 510a and second 510b input members are coaxial and concentric, and the first input member 510a is disposed partially within the second input member 510b. FIG. 5B shows another cross-sectional view of the differential 550, the view in FIG. 5B being perpendicular to the cross-sectional view provided in FIG. 5A.

The differential 550 includes a sun gear 551a and a ring gear 551b. The sun gear 551a and the ring gear 551b are coupled to the first 510a and second 510b input members, respectively, such that rotation of an input member results in rotation of a respective one of the sun gear and the ring gear. The differential 550 additionally includes planet gears 553a, 553b, 553c, 553d that engage with the sun gear 551a and ring gear 551b such that a difference in rotation between the first 510a and second 510b input members results in rotation of the planet gears 553a, 553b, 553c, 553d relative to a planet carrier of the differential 550 (not shown).

Rotation of one or more of the planet gears 553a, 553b, 553c, 553d may be coupled into an axial force/motion between the half-pulleys 530a, 530b in a variety of ways. As shown, the planet gears 553a, 553b are coupled to respective screws 555a, 555b. The screws 555a, 555b, in turn, are coupled to the first half-pulley 530a via respective threaded holes 539a, 539b such that rotation of the planet gears 553a, 553b, 553c, 553d results in rotation of the screws 5551, 555b, thereby enabling a change in the axial distance ("d") between the half-pulleys 530a, 530b.

A net torque provided by the first 510a and second 510b input members may be applied to the half-pulleys 530a, 530b, e.g., to drive a belt of a variable transmission and thus to drive an output of the variable transmission. Such a net torque may be coupled from the inputs to the half-pulleys via a housing of the differential 550, via a force exerted by the screws 555a, 555b onto the half-pulleys, or via some other element(s) of the split pulley 500.

Note that the embodiment shown in FIG. 5 is intended only as a non-limiting example. Alternative embodiments are anticipated. For example, the differential 550 could be disposed between the half-pulleys 530a, 530b and could extend additional screws, via respective threaded holes, from the planet gears to engage with threaded portions of the second half-pulley (530a). This could enable axial motion of the half-pulleys 530a, 530b that is symmetric with respect to the planet gear(s) or other elements of the differential 550. A diameter and/or number of teeth of the sun gear, the ring gear, and/or the planet gears could be specified to control a relationship between the differential torque and the applied transmission ratio-shifting force, to asymmetrically apportion energy from each of the two inputs toward transmission ratio-shifting and/or output driving, to control a mechanical advantage in shifting and/or output driving to one or both inputs, or to provide some other benefit according to an application. The example half-pulleys 530a, 530b are rigidly coupled, rotationally, to net rotation of the inputs 510a, 510b; however, the half-pulleys 530a, 530b could be coupled to the inputs 510a, 510b via respective cams and cam bearings to facilitate cycloidal motion of the half-pulleys 530a, 530b in response to net rotation of the input members 510a, 510b.

D. Threaded Cam Differential Shifter

In some examples, a differential could be provided that includes opposite-handed threaded portions (e.g., nuts, tapped holes, threads of a ball screw). The threaded portions could then be in contact with corresponding screws coupled to inputs of the differential. Accordingly, differential rotation of the inputs can cause axial motion/forces to be applied to a half-pulley in contact with the cam (as one screw screws into its corresponding threaded portion, the other screw unscrews from its corresponding threaded portion). In-common rotation of the inputs would result in a rotation of and/or an application of torque to the cam and/or the split pulley. The threaded portions could be rigidly coupled to each other (e.g., tapped from opposite direction into a single hole formed in the cam). Alternatively, the threaded portions could be formed in respective sub-portions (e.g., "sub-cams") of the cam, permitting relative motion between the threaded portions. Such sub-portions could be coupled via pins or other methodologies to permit relative axial motion between the sub-portions but to prevent relative rotation between the sub-portions. Such cams, screws, threaded portions, and associated elements could constitute a differential that applies differential torque between the inputs toward shifting the transmission ratio of a transmission (via axial motion of the cam) and that applies net torque toward an output torque of the transmission.

Figure 6:
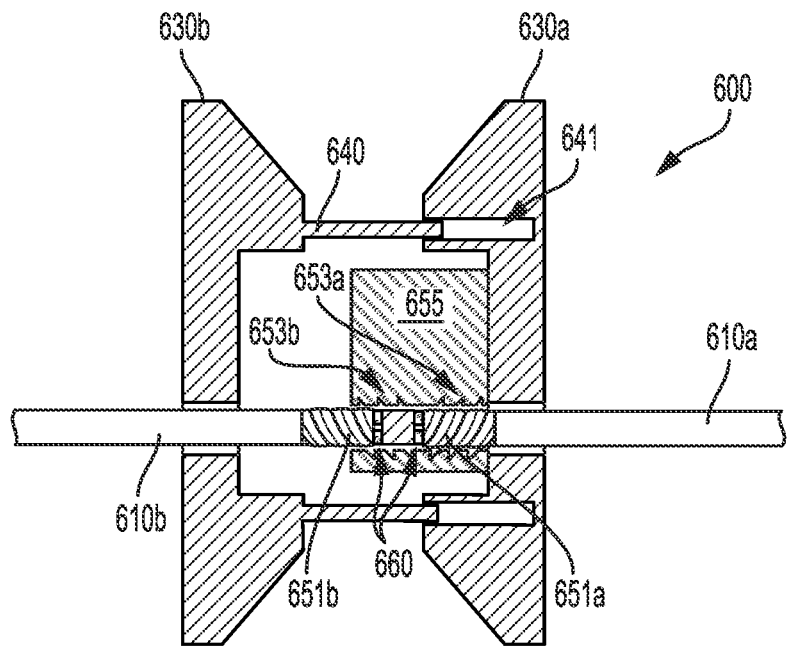
FIG. 6 is a cross-sectional view of an example shifting mechanism of a variable transmission.

FIG. 6 illustrates an example split pulley 600 (e.g., a split pulley of a variable transmission) that includes a cam 655 having first 653a and second 653b threaded portions (e.g., threads of respective ball screws). The threaded portions 653a, 653b have opposite handedness. The transmission 600 additionally includes first 630a and second 630b half-pulleys. The second half-pulley 730b includes pins 640 that extend into respective holes 641 of the first half-pulley 630a. The pins 640 allow the half-pulleys 630a, 630b to translate axially relative to each other but prevent relative rotation between the half-pulleys 630a, 630b (and thus may be employed to transmit torque from the input members 610a, 610b to the second half-pulley 630b). The first half-pulley 630a is rigidly coupled to the cam 655. Two input members 610a, 610b are coupled to respective screws 651a, 651b that are, themselves, engaged with respective threaded portions 653a, 653b of the cam 655 such that a torque difference between the first input member 610a and the second input member 610b causes an axial force to be applied, via the cam 655, between the first half-pulley 630a and the second half-pulley 630b. A thrust bearing 660 is provided to allow the first 651a and second 651b screws to exert axial forces on each other so as to effect the generation of the axial force between the half-pulleys 610a, 610b. Such an axial force may thus allow an axial distance ("d") between the first half-pulley 630a and the second half-pulley 630b to increase or decrease. The first 610a and second 610b input members extend outward from the half-pulleys 630a, 630b in opposite directions.

A net torque provided by the first 610a and second 610b input members may be applied to the half-pulleys 630a, 630b, e.g., to drive a belt of a variable transmission and thus to drive an output of the variable transmission. Such a net torque may be coupled from the inputs to the half-pulleys via the cam 655, via the pins 640, and/or some other element(s) of the split pulley 600.

Note that the arrangement of the cam 655, screws 651a, 651b, and half-pulleys 630a, 630b as shown in FIG. 6 is intended as a non-limiting example of a mechanism that uses such a doubly-threaded cam to effect control of the axial distance between first and second half-pulleys of a conical (or otherwise configured) split pulley. In another example, the cam could be provided as first and second sub-cams, having respective first and second opposite-handedness threaded portions. The sub-cams could be rigidly coupled to respective half-pulleys 630a, 630b and coupled to each other via pins or other methodologies to permit relative axial motion between the sub-portions (and between the half-pulleys) but to prevent relative rotation between the sub-portions.

Note that the embodiment shown in FIG. 6 is intended only as a non-limiting example. Alternative embodiments are anticipated. The example half-pulleys 630a, 630b are rigidly coupled, rotationally, to the cam 655 (and thus to net rotation of the inputs 610a, 610b); however, the half-pulleys 630a, 630b could be coupled to the inputs 610a, 610b and/or the cam 655 via respective additional cams and/or cam bearings to facilitate cycloidal motion of the half-pulleys 630a, 630b in response to net rotation of the input members 610a, 610b. Additionally or alternatively, the half-pulleys 630a, 630b could be driven by input members that rotate about an axis in common with the half-pulleys 630a, 630b. A pitch, lead, number of threads, and/or other properties of the screws 651a, 651b could be specified to control a relationship between the differential torque and the applied transmission ratio-shifting force, to asymmetrically apportion energy from each of the two inputs toward transmission ratio-shifting and/or output driving, to control a mechanical advantage in shifting and/or output driving to one or both inputs, or to provide some other benefit according to an application.

III. Additional Shifting Mechanisms

The example shifting mechanisms illustrated in FIGS. 3-6 and described above incorporate elements configured as a differential in order to provide, from a difference in torque between two inputs, a axially-directed shifting force between opposite half-pulleys of a conical (or otherwise configured) split pulley. However, other, non-differential mechanisms are also anticipated to permit rapid, controllable shifting of the transmission ratio of a split pulley variable transmission. For example, a first input could be provided that is coupled to a split pulley such that torque applied via the first input is applied, via the split pulley, to an output of the transmission (e.g., via a v-belt). A second input is also provided via which torque may be exerted to effect shifting of the transmission. In such an example, the shifting of the transmission ratio could be related to a relative rotation between the two inputs, and substantially unrelated to any difference in torque between the two inputs. In such an example, the second input could rotate at the same rate as the first input, with substantially no torque applied, to maintain the transmission ratio at a particular value. In such an example, the second input could be actively driven to match the speed of the first input. Alternatively, the second input could be decoupled from whatever motor is used to drive the second input in order to maintain the transmission ratio at a particular value. In yet another embodiment, the second input 720 could be coupled to a drive motor (e.g., to a drive motor used to drive the first input 710) via a clutch, such that the drive motor could operate to effect shifting of the transmission ratio when the drive motor is coupled, via the clutch, to the second input 720.

Figure 7:
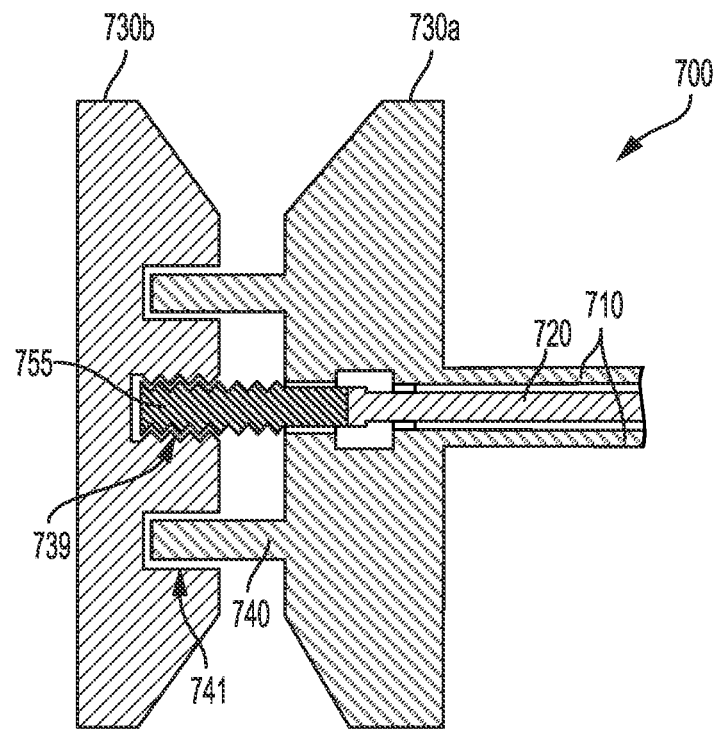
FIG. 7 is a cross-sectional view of an example shifting mechanism of a variable transmission.

FIG. 7 illustrates, in cross-section, an example of a split pulley 700 of such a transmission. The split pulley 700 includes two half pulleys 730a, 730b and two input members 710a, 710b. The first input member 710a is coupled to at least one of the half-pulleys 710a, 710b such that a torque applied to the first input member 710a is transmitted to the first 730a and second 730b half-pulleys. The first half-pulley 730a includes pins 740 that extend into respective holes 741 of the second half-pulley 730b. The pins 740 allow the half-pulleys 730a, 730b to translate axially relative to each other but prevent relative rotation between the half-pulleys 730a, 730b (and thus may be employed to transmit torque from the first input member 710 to the second half-pulley 730b).

A second input member 720 is coupled to a screw 755. The first 710a and second 710b input members are coaxial and concentric, and the first input member 710a is disposed partially within the second input member 710b. Accordingly, differential rotation between the first input member 710 and the second input member 720 can result in rotation of the screw 755. The screw 755 engages with a threaded portion 739 of the second half-pulley 730b such that differential rotation between the first input member 710 and the second input member 720 results in an axial force being applied, via the screw 755, between the first half-pulley 730a and the second half-pulley 730b, thus allowing an axial distance ("d") between the first half-pulley 730a and the second half-pulley 730b to increase or decrease.

Note that the embodiment shown in FIG. 7 is intended only as a non-limiting example. Alternative embodiments are anticipated. For example, a different mechanism (e.g., a rack, a linear gear, a threaded coupling between the half-pulleys) could be used to translate differential rotation between the first 710 and second 720 input members into an axial motion between the half-pulleys 730a, 730b. Multiple screws could be included, each driven by the second input (e.g., via one or more gears) to translate rotation of the second input 720 into an axial force/motion between the half-pulleys. The example half-pulleys 730a, 730b are rigidly coupled, rotationally, to rotation of the first input member 710; however, the half-pulleys 730a, 730b could be coupled to the first input 710 via respective cams and cam bearings to facilitate cycloidal motion of the half-pulleys 730a, 730b in response to rotation of the first input member 710.

IV. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

In particular, note that embodiments herein may be driven by inputs which extend outward from a split pulley (or other driven element(s)) in opposite directions or by inputs which extend in the same direction (e.g., inputs which are coaxial and which are nested within one another). Additionally, the embodiments illustrated herein which provide for the control of an axial separation between half-pulleys of a split pulley may receive inputs that are coaxial with a rotational and/or geometrical axis of the split pulley (e.g., that are coaxial with an axis of rotation of a conical bearing surface of the half-pulley(s)). Alternatively, such embodiments may receive inputs that are not coaxial with a rotational and/or geometrical axis of the split pulley (e.g., the input(s) may drive the split pulley via one or more cams, to enable driving the split pulley according to a nested transmission configuration or to facilitate some other application).

What is claimed is:

1. A transmission having a controllable transmission ratio for more rapid or more controllable shifting, the transmission comprising:
   a first conical split pulley having a first half-pulley and a second half-pulley;
   a first input member coupled to the first half-pulley and the second half-pulley such that a torque applied to the first input member is transmitted to the first and second half-pulleys;
   a second input member;
   a screw, wherein the second input member is coupled to the screw such that a differential rotation between the first input member and the second input member causes an axial force to be applied, via the screw, between the first half-pulley and the second half-pulley, thus allowing an axial distance between the first half-pulley and the second half-pulley to increase or decrease, which thereby enables a change in an effective diameter of the first conical split pulley resulting in the controllable transmission ratio of the transmission;
   a second conical split pulley having a third half-pulley and a fourth half-pulley, wherein the first conical split pulley is nested within the second conical split pulley; and
   a belt that couples the first conical split pulley to the second conical split pulley;
   wherein application of a torque via the first input member causes a torque to be transmitted from the first conical split pulley to the second conical split pulley via the belt.

2. The transmission of claim 1, further comprising an output member, wherein the second conical split pulley is coupled to a mechanical ground such that the third and fourth half-pulleys are prevented from rotating, and wherein the output member is coupled to at least one of the first half-pulley or the second half-pulley such that rotation of the first conical split pulley results in rotation of the output member.

3. The transmission of claim 1, wherein the third half-pulley and the fourth half-pulley are coupled to each other via an elastic element such that an axial force is exerted between the third half-pulley and the fourth half-pulley by the elastic element.

4. The transmission of claim 1, wherein the first input member and the second input member are coaxial and concentric and wherein the first input member is disposed at least partially within the second input member.

5. The transmission of claim 1, wherein the first input member and the second input member extend outward from the first conical split pulley in opposite directions.

6. A transmission having a controllable transmission ratio for more rapid or more controllable shifting, the transmission comprising:
   a first conical split pulley having a first half-pulley and a second half-pulley;
   a first input member coupled to the first half-pulley and the second half-pulley such that a torque applied to the first input member is transmitted to the first and second half-pulleys;
   a second input member;
   a screw, wherein the second input member is coupled to the screw such that a differential rotation between the first input member and the second input member causes an axial force to be applied, via the screw, between the first half-pulley and the second half-pulley, thus allowing an axial distance between the first half-pulley and the second half-pulley to increase or decrease, which thereby enables a change in an effective diameter of the first conical split pulley resulting in the controllable transmission ratio of the transmission; and
   a cam, wherein the first input member has a first axis of rotation, and wherein the first conical split pulley has a second axis of rotation that is offset from the first axis of rotation, and wherein the first input member is coupled to the first half-pulley via the cam.

7. A transmission having a controllable transmission ratio for more rapid or more controllable shifting, the transmission comprising:
a first conical split pulley having a first half-pulley and a second half-pulley;
a first input member coupled to the first half-pulley and the second half-pulley such that a torque applied to the first input member is transmitted to the first and second half-pulleys;
a second input member;
a screw, wherein the second input member is coupled to the screw such that a differential rotation between the first input member and the second input member causes an axial force to be applied, via the screw, between the first half-pulley and the second half-pulley, thus allowing an axial distance between the first half-pulley and the second half-pulley to increase or decrease, which thereby enables a change in an effective diameter of the first conical split pulley resulting in the controllable transmission ratio of the transmission; and
a pin rigidly coupled to the first half-pulley and disposed within a hole of the second half-pulley, thereby preventing relative rotation between the first half-pulley and second-half-pulley while permitting the first half-pulley and second-half-pulley to translate relative to each other.

8. The transmission of claim 1, further comprising an additional screw, wherein the second input member is also coupled to the additional screw such that a differential rotation between the first input member and the second input member causes an additional axial force to be applied, via the additional screw, between the first half-pulley and the second half-pulley, thus allowing an axial distance between the first half-pulley and the second half-pulley to increase or decrease, which thereby enables a change in an effective diameter of the first conical split pulley resulting in the controllable transmission ratio of the transmission.

9. A transmission having a controllable transmission ratio for more rapid or more controllable shifting, the transmission comprising:
a first conical split pulley having a first half-pulley and a second half-pulley;
a first input member coupled to the first half-pulley and the second half-pulley such that a torque applied to the first input member is transmitted to the first and second half-pulleys;
a second input member;
a shifting mechanism, wherein the second input member is coupled to the shifting mechanism such that a differential rotation between the first input member and the second input member causes an axial force to be applied, via the shifting mechanism, between the first half-pulley and the second half-pulley, thus allowing an axial distance between the first half-pulley and the second half-pulley to increase or decrease, which thereby enables a change in an effective diameter of the first conical split pulley resulting in the controllable transmission ratio of the transmission;
a second conical split pulley having a third half-pulley and a fourth half-pulley, wherein the first conical split pulley is nested within the second conical split pulley; and
a belt that couples the first conical split pulley to the second conical split pulley;
wherein application of a torque via the first input member causes a torque to be transmitted from the first conical split pulley to the second conical split pulley via the belt.

10. The transmission of claim 9, further comprising an output member, wherein the second conical split pulley is coupled to a mechanical ground such that the third and fourth half-pulleys are prevented from rotating, and wherein the output member is coupled to at least one of the first half-pulley or the second half-pulley such that rotation of the first conical split pulley results in rotation of the output member.

11. The transmission of claim 9, wherein the third half-pulley and the fourth half-pulley are coupled to each other via an elastic element such that an axial force is exerted between the third half-pulley and the fourth half-pulley by the elastic element.

12. The transmission of claim 9, wherein the first input member and the second input member are coaxial and concentric and wherein the first input member is disposed at least partially within the second input member.

13. The transmission of claim 9, wherein the first input member and the second input member extend outward from the first conical split pulley in opposite directions.

14. A transmission having a controllable transmission ratio for more rapid or more controllable shifting, the transmission comprising:
a first conical split pulley having a first half-pulley and a second half-pulley;
a first input member coupled to the first half-pulley and the second half-pulley such that a torque applied to the first input member is transmitted to the first and second half-pulleys;
a second input member;
a shifting mechanism, wherein the second input member is coupled to the shifting mechanism such that a differential rotation between the first input member and the second input member causes an axial force to be applied, via the shifting mechanism, between the first half-pulley and the second half-pulley, thus allowing an axial distance between the first half-pulley and the second half-pulley to increase or decrease, which thereby enables a change in an effective diameter of the first conical split pulley resulting in the controllable transmission ratio of the transmission; and
a cam, wherein the first input member has a first axis of rotation, and wherein the first conical split pulley has a second axis of rotation that is offset from the first axis of rotation, and wherein the first input member is coupled to the first half-pulley via the cam.

15. A transmission having a controllable transmission ratio for more rapid or more controllable shifting, the transmission comprising:
a first conical split pulley having a first half-pulley and a second half-pulley;
a first input member coupled to the first half-pulley and the second half-pulley such that a torque applied to the first input member is transmitted to the first and second half-pulleys;
a second input member;
a shifting mechanism, wherein the second input member is coupled to the shifting mechanism such that a differential rotation between the first input member and the second input member causes an axial force to be applied, via the shifting mechanism, between the first half-pulley and the second half-pulley, thus allowing an axial distance between the first half-pulley and the second half-pulley to increase or decrease, which thereby enables a change in an effective diameter of the first conical split pulley resulting in the controllable transmission ratio of the transmission; and a pin rigidly coupled to the first half-pulley and disposed within a hole of the second half-pulley, thereby preventing relative rotation between the first half-pulley and second-half-pulley while permitting the first half-pulley and second-half-pulley to translate relative to each other.

16. A transmission having a controllable transmission ratio for more rapid or more controllable shifting, the transmission comprising:

a first conical split pulley having a first half-pulley and a second half-pulley;

a first input member coupled to the first half-pulley and the second half-pulley such that a torque applied to the first input member is transmitted to the first and second half-pulleys;

a second input member; and a shifting mechanism, wherein the second input member is coupled to the shifting mechanism such that a differential rotation between the first input member and the second input member causes an axial force to be applied, via the shifting mechanism, between the first half-pulley and the second half-pulley, thus allowing an axial distance between the first half-pulley and the second half-pulley to increase or decrease, which thereby enables a change in an effective diameter of the first conical split pulley resulting in the controllable transmission ratio of the transmission, wherein the shifting mechanism comprises a rack and a pinion, wherein the pinion engages with the rack, and wherein the second input member is coupled to the pinion such that differential rotation of the second input member relative to the first input member results in rotation of the pinion, which thereby enables a change in the axial distance between the first half-pulley and the second half-pulley via application of force from the pinion onto the rack.

* * * * *